United States Patent
Trella et al.

(10) Patent No.: US 11,961,535 B2
(45) Date of Patent: Apr. 16, 2024

(54) DETECTION OF LASER-BASED AUDIO INJECTION ATTACKS USING CHANNEL CROSS CORRELATION

(71) Applicant: Intel Corporation, Santa Clara, CA (US)

(72) Inventors: Pawel Trella, Gdansk (PL); Przemyslaw Maziewski, Gdansk (PL); Jan Banas, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 16/941,191

(22) Filed: Jul. 28, 2020

(65) Prior Publication Data

US 2020/0357426 A1 Nov. 12, 2020

(51) Int. Cl.
*G10L 25/69* (2013.01)
*G10L 15/22* (2006.01)
*H04R 3/00* (2006.01)

(52) U.S. Cl.
CPC ............ *G10L 25/69* (2013.01); *G10L 15/22* (2013.01); *G10L 2015/221* (2013.01); *H04R 3/005* (2013.01)

(58) Field of Classification Search
CPC ... G10L 25/69; G10L 15/22; G10L 2015/221; H04R 3/005
See application file for complete search history.

(56) References Cited

U.S. PATENT DOCUMENTS

2012/0290297 A1 11/2012 Baughman
2015/0271616 A1 9/2015 Kechichian
(Continued)

FOREIGN PATENT DOCUMENTS

WO WO-2019002849 A1 * 1/2019 ......... G01R 33/0094

OTHER PUBLICATIONS

Sugawara, Takeshi et al., "Light Commands: Laser-Based Audio Injection Attacks on Voice Controllable Systems*", retrieved from Internet https://lightcommands.com/20191104-Light-Commands.pdf (accessed Nov. 2019) 18 pages.
(Continued)

*Primary Examiner* — Mohammad K Islam
(74) *Attorney, Agent, or Firm* — Hanley, Flight & Zimmerman, LLC (57) ABSTRACT

Techniques are provided for detection of laser-based audio injection attacks. A methodology implementing the techniques according to an embodiment includes calculating cross correlations between signals received from microphones of an array of two or more microphones. The method also includes identifying time delays associated with peaks of the cross correlations, and magnitudes associated with the peaks of the cross correlations. The method further includes calculating a time alignment metric based on the time delays and calculating a similarity metric based on the magnitudes. The method further includes generating a first attack indicator based on a comparison of the time alignment metric to a first threshold and generating a second attack indicator based on a comparison of the similarity metric to a second threshold. The method further includes providing warning of a laser-based audio attack based on the first attack indicator and/or the second attack indicator.

20 Claims, 7 Drawing Sheets

(56) References Cited

U.S. PATENT DOCUMENTS

| | | |
|---|---|---|
| 2017/0330570 A1 | 11/2017 | Srinivasan |
| 2018/0167747 A1 | 6/2018 | Kuriger et al. |
| 2019/0043471 A1* | 2/2019 | Maziewski .............. H04K 3/00 |
| 2019/0237096 A1 | 8/2019 | Trella et al. |
| 2020/0020330 A1* | 1/2020 | Guo ..................... G01R 31/002 |
| 2020/0243067 A1 | 7/2020 | Maziewski et al. |
| 2021/0020189 A1 | 1/2021 | Jukic |
| 2021/0335383 A1 | 10/2021 | John |

OTHER PUBLICATIONS

Tung L., "Alexa, Siri, Google Assistant smart speakers—they're all open to remote laser attacks", retrieved from Internet https://www.zdnet.com/article/alexa-siri-google-assistant-smart-speakers-theyreall-open-to-remote-laser-attacks/?ftag=TRE-03-10aaa6b&bhid=264280829664209841115064 68259355 (accessed Nov. 2019), Nov. 2019, 4 pages.

U.S. Appl. No. 16/849,525, filed Apr. 15, 2020, 34 pages.

"Room modes", Wikipedia, available at https://en.wikipedia.org/wiki/Room_modes, retrieved on Apr. 8, 2020, 3 pages.

ISO 3382-2:2008, "Acoustics—Measurement of Room Acoustic Parameters—Part 2: Reverberation Time in Ordinary Rooms", available at https://www.iso.org/standard/362001.html, retrieved on Apr. 8, 2020, 3 pages.

ASA Acoustical Society of America, "Direct-to-Reverberant Ratio", available at https://asastandards.org/Terms/direct-to-reverberant-ratio/, retrieved on Apr. 8, 2020, 2 pages.

United States Patent and Trademark Office, "Non-Final Office Action," issued in connection with U.S. Appl. No. 16/849,525, mailed on Jun. 6, 2023, 27 pages.

United States Patent and Trademark Office, "Final Office Action," issued in connection with U.S. Appl. No. 16/849,525, dated Dec. 4, 2023, 31 pages.

* cited by examiner

DETECTION OF LASER-BASED AUDIO INJECTION ATTACKS USING CHANNEL CROSS CORRELATION

BACKGROUND

Voice-controlled systems and devices, which perform actions based on recognized speech from a user, are becoming increasingly popular. As these systems achieve widespread use, laser-based audio injection attacks are posing a new and growing threat. This type of attack uses a laser signal to inject malicious commands into a microphone of the voice-controlled system. The laser signal is inaudible and can be effective at relatively large distances, which makes these attacks difficult to detect. For this reason, most currently available voice-controlled systems and devices are likely vulnerable to such attacks.

Although the following Detailed Description will proceed with reference being made to illustrative embodiments, many alternatives, modifications, and variations thereof will be apparent in light of this disclosure.

DETAILED DESCRIPTION

Techniques are provided for defending against a laser-based audio injection attack that can compromise the security of a speech-enabled or voice-controlled system or device, such as a smart-speaker, personal assistant, home management system, and the like, which are configured to perform actions in response to user spoken requests. These devices are vulnerable, however, to attack from inaudible laser signals which have been modulated by speech that can command the devices to perform unintended and/or malicious tasks. The devices can thus be spoofed into waking from a sleep state and acting on commands embedded in the laser signal, without the user's knowledge. Embodiments of the present disclosure provide techniques for differentiating an attack speech signal from legitimate spoken commands from the user, based on analysis of the cross correlations of the received audio signals at two or more microphones. If the attack speech signal is delivered on a narrow beam laser (e.g., a pencil beam laser), then that beam will likely illuminate only one microphone. In this case the detection of a signal on only one microphone can be used to distinguish an attack signal from the legitimate signal. However, if the attack speech signal is delivered on a wider beam laser (e.g., a flashlight laser), all microphones may be illuminated. In that case, cross correlation of the signals can provide an indication of a laser attack based on the time delays between the signals from the microphones. Legitimate speech travels at the speed of sound (approximately 340 meters per second) which results in significant and measurable time delays between microphones at typical spacing in a speech enabled device. In contrast, laser signals travel at the speed of light (approximately $3*10^9$ meters per second) which results in no measurable time delay between microphones, at least at the sampling frequencies employed for acoustic processing.

The disclosed techniques can be implemented, for example, in a computing system or a software product executable or otherwise controllable by such voice-controlled systems, although other embodiments will be apparent. The system or product is configured to defend against a laser-based audio injection attack on a speech-enabled or voice-controlled device (speech-enabled, going forward). In accordance with such an embodiment, a methodology to implement these techniques includes calculating cross correlations between signals received from microphones of an array of two or more microphones. The method also includes identifying time delays associated with peaks of the cross correlations, and magnitudes associated with the peaks of the cross correlations. The method further includes calculating a time alignment metric based on the time delays and calculating a similarity metric based on the magnitudes. The method further includes generating a first attack indicator based on a comparison of the time alignment metric to a first threshold and generating a second attack indicator based on a comparison of the similarity metric to a second threshold. The method further includes providing warning of a laser-based audio attack based on the first attack indicator and/or the second attack indicator.

As will be appreciated, the techniques described herein may provide an improved defense against laser-based audio injection attack, compared to existing techniques that employ a masking mesh to attempt to block the laser beam, which can be defeated by increasing the power of the laser. The disclosed techniques can be implemented on a broad range of platforms including home management systems, workstations, laptops, tablets, and smartphones. These techniques may further be implemented in hardware or software or a combination thereof.

System Architecture

Figure 1:
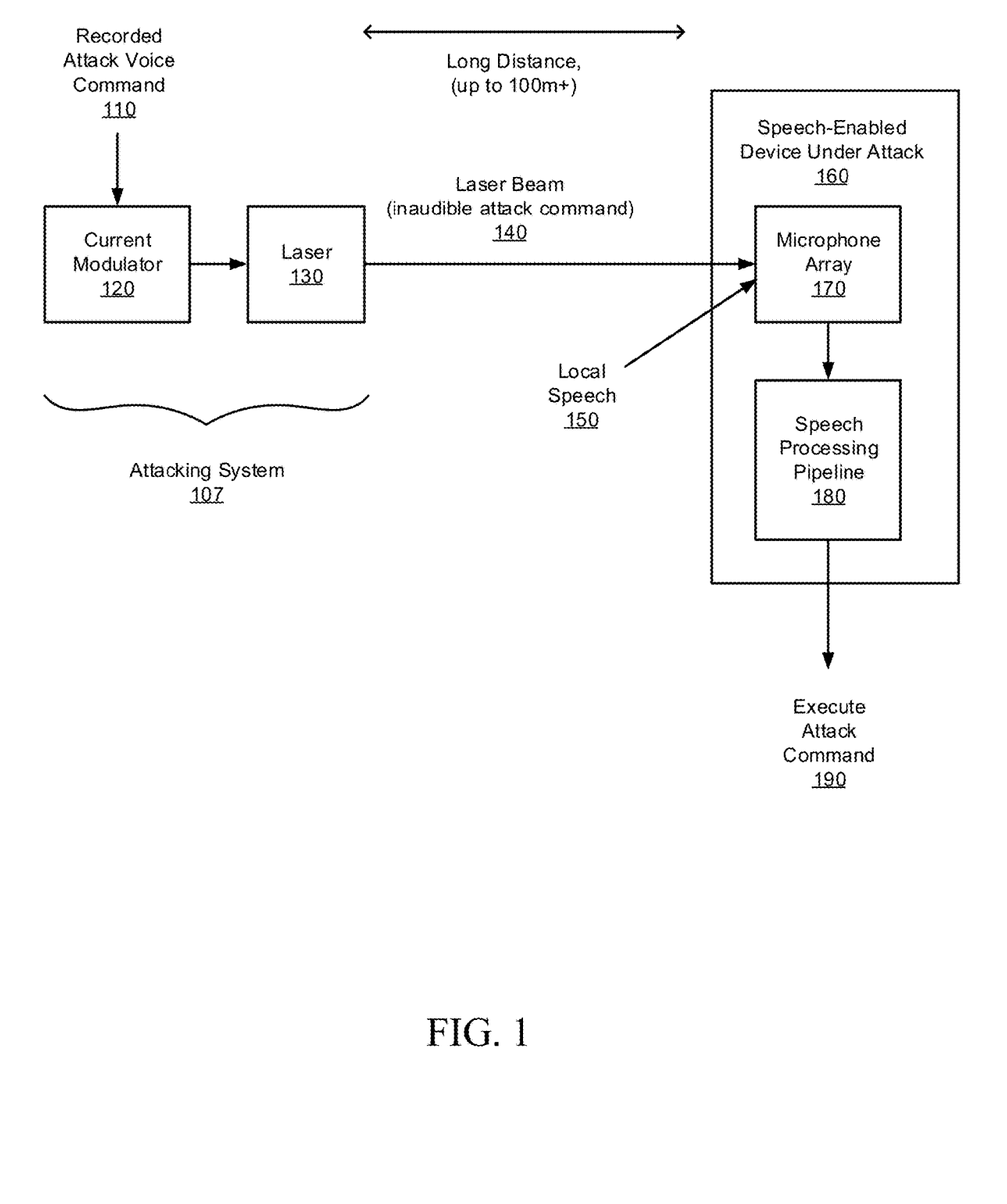
FIG. 1 illustrates an example laser attack on a speech-enabled device configured in accordance with an embodiment of the present disclosure.

FIG. 1 illustrates a laser attack scenario 100 on a speech-enabled device 160 configured in accordance with an embodiment of the present disclosure. A system configured for implementing the laser-based attack (e.g., the attacking system) 107 is shown to include a current modulator 120 and a laser 130. The speech-enabled device under attack 160 is shown to include an array of microphones 170 and a speech processing pipeline 180.

During normal operation, the speech-enabled device 160 is configured to receive audio signals containing local speech 150 from a user (or users) of the device 160 through the microphones 170. In some embodiments, the speech-enabled device 160 may be a smart-speaker, personal assistant, home management system, or any device configured to receive an audio signal containing spoken commands, recognize the commands, and act on those commands, for example through speech processing pipeline 180. In some example embodiments, the device may be connected to the Internet and/or a local network to facilitate the performance of the requested tasks. For example, the user may say "computer, play song xyz," or "computer, set the temperature to 70 degrees," or "computer, send the following email to my friend Joe." In these examples, the term "computer" is used as a wake-up key phrase to get the attention of the device 160, which may have been in a low-power or sleep state. The remaining portion of speech includes a command for the device to act upon. In some example embodiments, note that a wake-up key phrase is not needed, in that the device is trained to listen for the user's voice and act on certain commands given by that user (or set of users).

Figure 2:
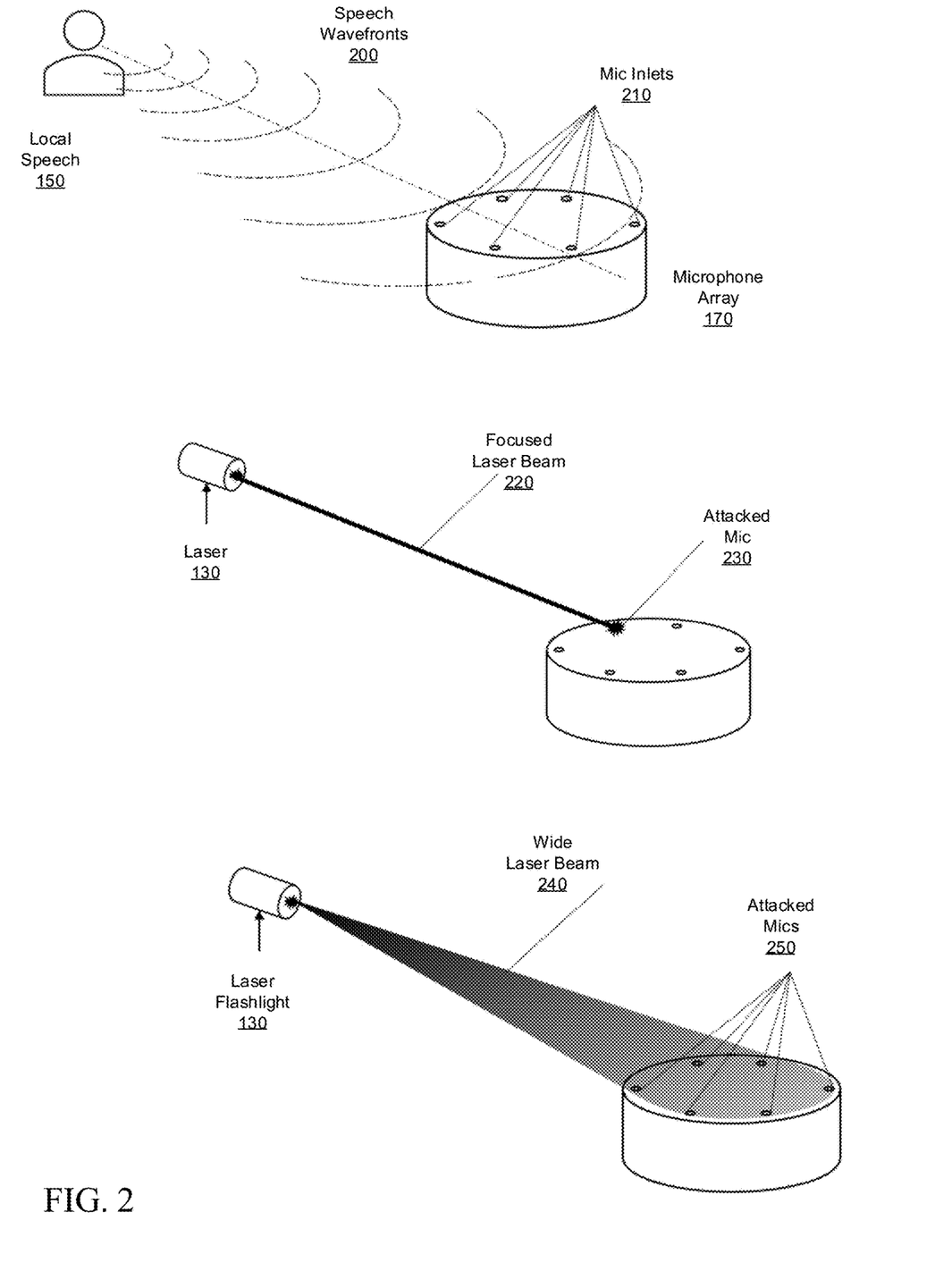
FIG. 2 illustrates speech signals and laser signals directed towards a microphone array, in accordance with an embodiment of the present disclosure.

FIG. 2 illustrates speech signals and laser signals directed towards a microphone array, in accordance with an embodiment of the present disclosure. In the first scenario (top portion of the diagram) local or legitimate speech 150 is shown to be emitted from a user of the system. Acoustic speech wavefronts 200 travel from the user to the microphone array 170 and are received by microphone inlets 210 associated with each microphone of the array. The acoustic speech wavefronts 200 travel at the speed of sound. In the second scenario (middle portion of the diagram), a focused laser beam 220 is emitted by laser 130. This focused pencil beam 220 illuminates just one of the microphones (e.g., the attacked microphone 230). In the third scenario (bottom portion of the diagram), a wider laser beam 240 is emitted by laser flashlight 130. This wider beam 240 illuminates all (or at least more than one) of the microphones (e.g., the attacked microphones 250). The laser beams 220 and 240 travel at the speed of light which is approximately eight orders of magnitude faster than the speed of sound.

Figure 3:
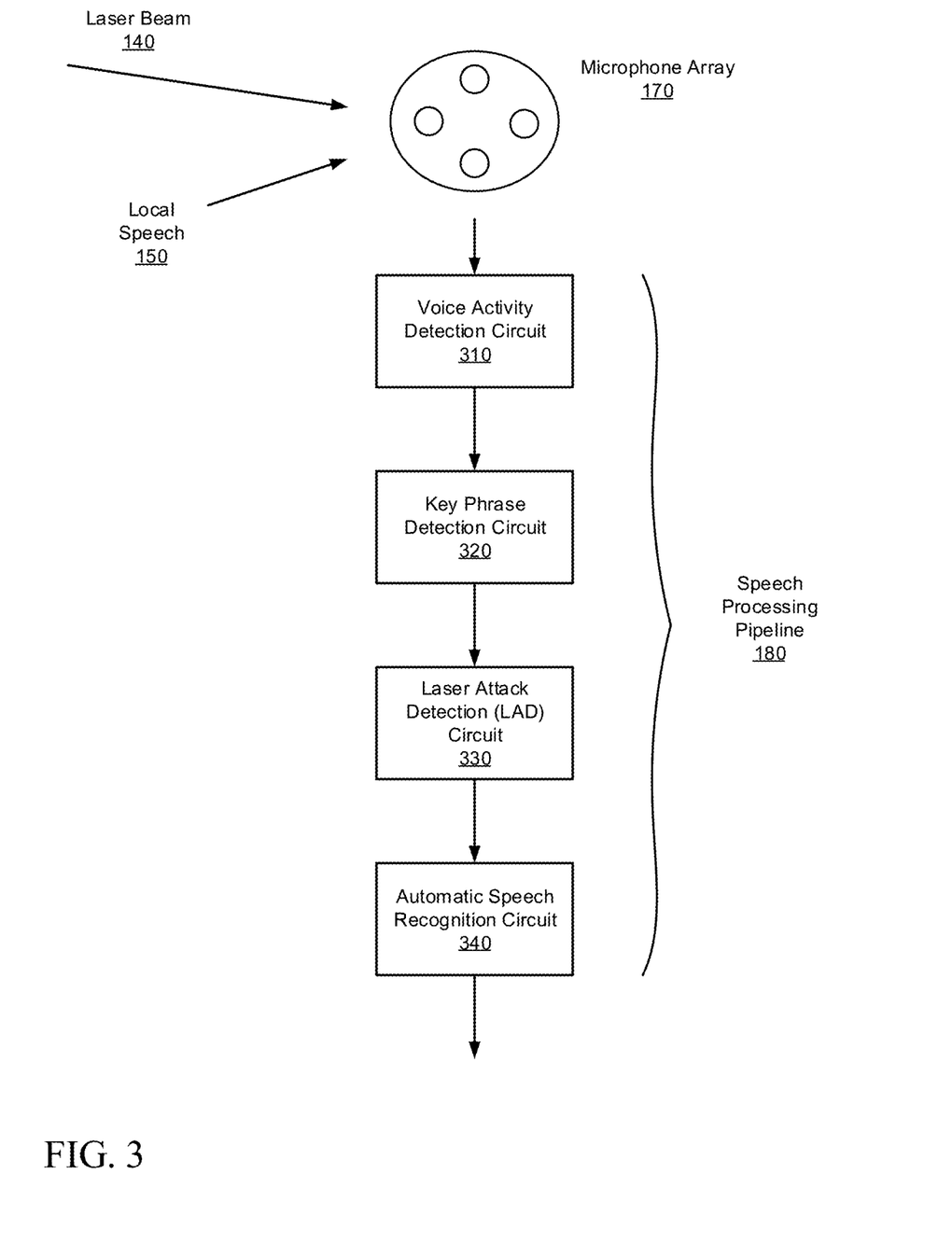
FIG. 3 is a block diagram of the device under attack, configured in accordance with an embodiment of the present disclosure.

FIG. 3 is a block diagram of the device under attack 160, configured in accordance with an embodiment of the present disclosure. As can be seen, the device 160 of this example embodiment is shown to include microphone array 170, voice activity detection circuit 310, key phrase detection circuit 320, laser attack detection circuit 330, and automatic speech recognition (ASR) circuit 340.

In some embodiments, the microphones of the array of microphones 170 may include any of the following types of microphones: analog microphones, digital microphones, electret microphones, and dynamic microphones, to name just a few. During normal operation, acoustic vibrations associated with the local speech 150 pass through inlets of the microphones, causing vibration of the microphone membrane which is translated into an electrical signal that represents the acoustic signal. During a laser attack, the laser beam 140 also passes through the microphone inlets and induces mechanical vibration of the microphone membrane which is translated into an electrical signal that represents the attack voice command 110. These signals, whether legitimate local speech 150 or attack voice commands 110, are passed on to the speech processing pipeline 180.

Voice activity detection circuit 310 is configured to detect the presence of speech (e.g., voice activity) in the signal provided by microphones 170, to serve, for example, as a trigger to initiate further processing in the pipeline 180. Voice activity detection can be performed using any suitable technique in light of the present disclosure.

In some embodiments, key phrase detection circuit 320 may be provided as an optional component configured to detect a key phrase in the detected speech (e.g., a wake-up or wake-on-voice key phrase) as a trigger to initiate further processing in the pipeline 180. Key phrase detection can be performed using any suitable technique in light of the present disclosure.

Laser attack detection circuit 330 is configured to detect a laser-based audio injection attack based on analysis of the correlation of signals provided from the microphones 170. The operation of laser attack detection circuit 330 will be described in greater detail below in connection with FIG. 5, but at a high-level, the analysis serves to characterize differences in time delays and correlation magnitudes between the signals which can be employed to distinguish laser signals from acoustic signals.

ASR circuit 340 is configured to perform speech recognition on the signals provided from the microphones 170, so that recognized speech commands can be acted upon. ASR can be performed using any suitable technique in light of the present disclosure.

Figure 4:
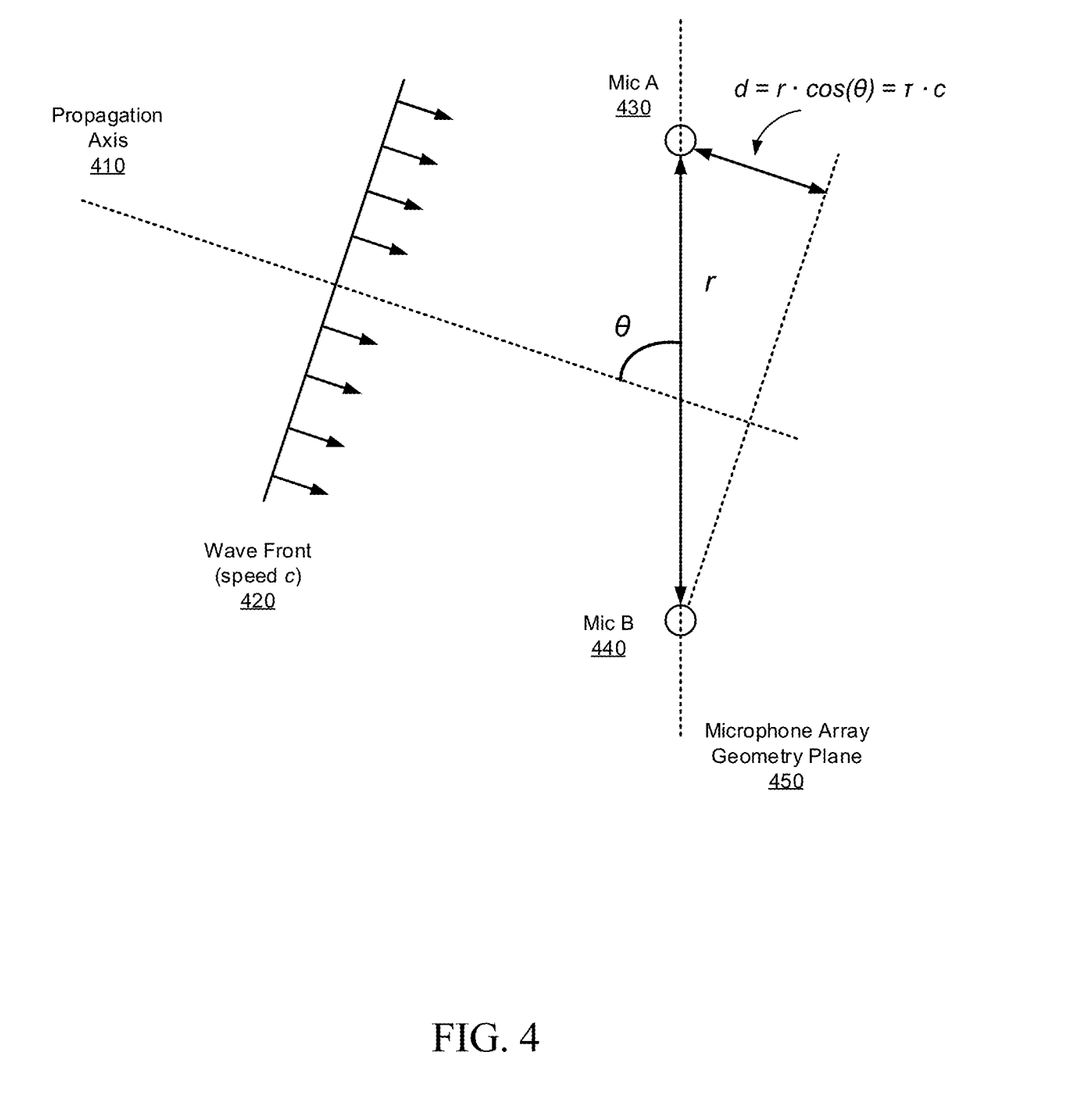
FIG. 4 illustrates time delay as a function of array geometry, in accordance with an embodiment of the present disclosure

FIG. 4 illustrates time delay as a function of array geometry 400, in accordance with an embodiment of the present disclosure. Wavefront 420 (e.g., acoustic or laser) is shown traveling along propagation axis 410 at speed c. The wavefront impinges on two microphones (microphone A 430 and microphone B 440) located along microphone array geometry plane 450. The distance between the microphones is shown as r and the angle between the propagation axis 410 and the microphone array geometry plane 450 is shown as θ. The additional distance d that is traveled by the wavefront as it passes from microphone A 430 to microphone B 440 can be expressed as:

$$d = r \cdot \cos(\theta) = \tau \cdot c$$

where x is the time delay between arrival of the signal at microphone A 430 and microphone B 440. Alternatively, τ can be expressed as:

$$\tau = \frac{r \cdot \cos(\theta)}{c}$$

Thus, for a given geometry and arrival direction, which determine r and θ, τ is inversely proportional to c. For a laser, where c equals the speed of light, τ effectively becomes zero at the sampling rates used in audio systems.

Figure 5:
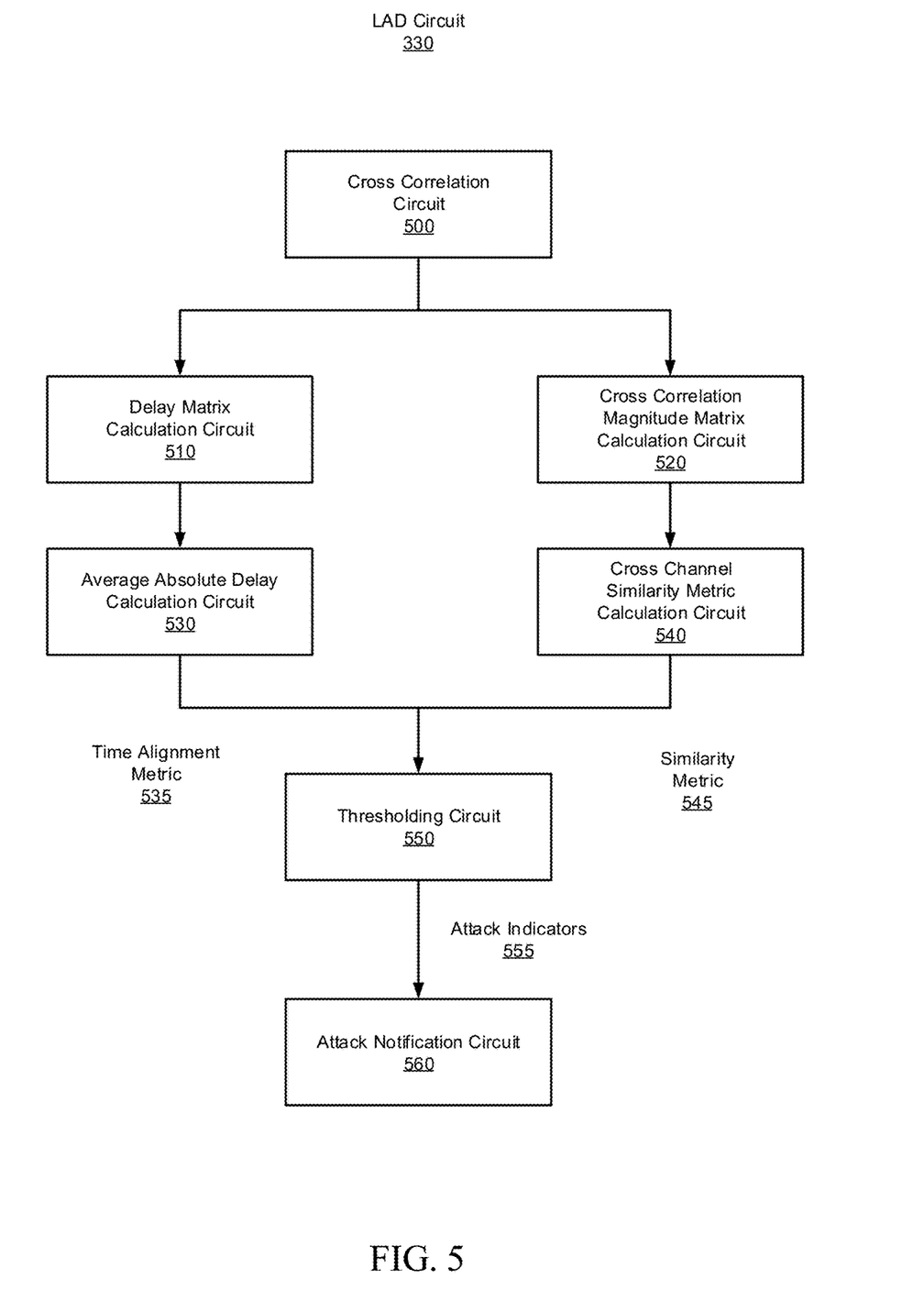
FIG. 5 is a block diagram of a laser attack detection circuit, configured in accordance with an embodiment of the present disclosure.

FIG. 5 is a block diagram of a laser attack detection circuit 330, configured in accordance with an embodiment of the present disclosure. As can be seen, laser attack detection circuit 330 of this example embodiment is shown to include a cross correlation circuit 500, delay matrix calculation circuit 510, cross correlation magnitude matrix calculation circuit 520, average absolute delay calculation circuit 530, cross channel similarity metric calculation circuit 540, thresholding circuit 550, and attack notification circuit 560.

Cross correlation circuit 500 is configured to calculate cross correlations between all or some of the possible combinations of signals received from each microphone of the array of microphones. The correlation between signals $s_A$, $s_B$ from microphones A and B can be expressed as:

$$\widehat{R_{AB}} = (s_A \star s_B)[n] \stackrel{def}{=} \sum_{m=-\infty}^{\infty} s_A[m] s_B[m+n]$$

where A∈⟨1, N⟨, B∈⟩1, N⟩ for an N-channel microphone array, and m, n are the sample indices in a digital signal representation and can be associated with time in a corresponding analog representation for a given sampling frequency. The cross correlation across all channels can be expressed in matrix form R for simplicity:

$$\hat{R} = \begin{bmatrix} \widehat{R_{11}} & \cdots & \widehat{R_{1N}} \\ \vdots & \ddots & \vdots \\ \widehat{R_{N1}} & \cdots & \widehat{R_{NN}} \end{bmatrix}$$

Values on the diagonal of this matrix represent the autocorrelation of the signal from the i-th microphone for i ranging from 1 to N.

For each element in the matrix R, two values can be extracted: the delay ($\tau$) and the amplitude or magnitude of the peak of the cross correlation function (M). This may be expressed as:

$$\tau_{AB} = \text{argmax}(\widehat{R_{AB}})$$

$$M_{AB} = \text{max}(\widehat{R_{AB}})$$

where the argmax function provides the index of the sample of the maximum value. These values may also be expressed in matrix form for simplicity:

$$\tau = \begin{bmatrix} \tau_{11} & \cdots & \tau_{1N} \\ \vdots & \ddots & \vdots \\ \tau_{N1} & \cdots & \tau_{NN} \end{bmatrix}$$

$$M = \begin{bmatrix} M_{11} & \cdots & M_{1N} \\ \vdots & \ddots & \vdots \\ M_{N1} & \cdots & M_{NN} \end{bmatrix}$$

Delay matrix calculation circuit 510 is configured to calculate the $\tau$ matrix, and cross correlation magnitude matrix calculation circuit 520 is configured to calculate the M matrix.

Values on the diagonal of the delay matrix T are all equal to zero since they represent a delay between i-th microphone with itself. The absolute values above and below the diagonal of the delay matrix can be used to calculate the average absolute delay across all channels ($\bar{\tau}$) as:

$$\bar{\tau} = \frac{\Sigma_N |\tau - \text{diag}(\tau_{11}, \ldots, \tau_{NN})|}{N^2 - N}$$

The average absolute delay calculation circuit 530 is configured to calculate f, the time alignment metric 535.

Values of the elements of the M matrix are indicators of how well individual channel pairs would be correlated if they were time aligned. Values on the main diagonal of the M matrix represent the autocorrelation magnitudes. Genuine speech acoustic signals that reach all microphones should be time-shifted but similar, which is to say that the correlation of delay compensated signals should be high. A cross-channel similarity metric $\bar{M}$, extracted from the matrix M, can be defined as the minimum cross-correlation magnitude scaled by the average autocorrelation magnitude:

$$\bar{M} = \frac{\min_N M}{\frac{1}{N}\Sigma_{i=1}^{N} M_{nn}}$$

Cross channel similarity metric calculation circuit 540 is configured to calculate $\bar{M}$, the similarity metric 545.

Thresholding circuit 550 is configured to compare the time alignment metric 535 and the similarity metric 545 to selected threshold values to determine if a laser attack has been attempted. The time alignment metric 535 represents overall time alignment across all channels. Values close to zero suggests that signals are almost perfectly time aligned (e.g., no delay), raising a suspicion that they may be of laser origin. This metric can be compared an empirically selected threshold value and if the metric is less than the threshold value, a first attack indicator can be generated.

The similarity metric 545 can be compared to another empirically selected threshold value to provide a second attack indicator. The similarity metric is expected to be higher for the case of an acoustic speech signal than for a laser attack attempt since the laser will likely not illuminate all of the microphones with equal energy.

As previously mentioned, detecting a signal on only one (or a subset) of the total number of available microphones may be used as an attack indicator for cases where a laser beam does not illuminate all of the microphones.

Additionally, in some embodiments, environmental effects can be detected and employed to distinguish real speech from a laser attack. Due to the fact that (1) rooms are almost always asymmetrical; (2) the location of the device in the room is not symmetrical; and (3) the individual surfaces that reflect sound in the room (e.g., walls, ceiling, floor, etc.) have different reflection coefficients resulting from different material compositions, the frequency response of the room will exhibit spatial variation. Depending upon where the microphone is located in the room, the speech signal will exhibit a different frequency response. This phenomenon can be observed for microphone displacements of only a few centimeters which can cause noticeable changes in the spectrum color of the speech recorded by the microphone. Thus, analysis of the similarity in the shape of the frequency response between microphones in the array can be used to distinguish between a laser attack and a legitimate speech signal. For the laser attack, the spectrum color will be the substantially uniform across all the microphones in the array. For speech, even if originating in the middle of the microphone array, the spectrum color will be different due to the asymmetry of the room response.

Additionally, in some embodiments, a direction of arrival circuit may be employed to estimate the direction of arrival of the signal. If the direction is in an unexpected angular range relative to the device platform or the microphone array, that may serve as yet another attack indicator. For example, if the speech appears to be coming from the ceiling of a conference room, that may be considered suspicious in some cases.

Attack notification circuit 560 is configured to provide warning of a laser-based audio attack based on any combination of the attack indicators. In some embodiments, the attack notification circuit 560 may further request confirmation from the user prior to executing a command resulting from speech recognition of the received signals, if any of the attack indicators were generated.

In some embodiments, the array of microphones comprises at least four microphones distributed over a 3-dimensional volume. The functionality of this embodiment is not adversely affected by the directionality of the signal. In some other embodiments, the array of microphones comprises at least three microphones distributed over a 2-dimensional plane and the plane is oriented such that the plane is not perpendicular to an expected direction of arrival of an acoustic signal. For this case, as the plane orientation approaches perpendicularity to the direction of arrival of the signal, the false positive alarm rate will increase as it becomes more difficult to measure time delays between the microphones. In some other embodiments, the array of microphones comprises at least two microphones. For this case, the similarity metric can be used to detect the attack based on the fact that real speech signals captured by both microphones will exhibit differences (due to varying environmental/room frequency response, as previously described) that can distinguish the real speech from a laser injected signal which will not exhibit these differences since the laser does not interact with the environment/room in a manner that affects the frequency response.

Methodology

Figure 6:
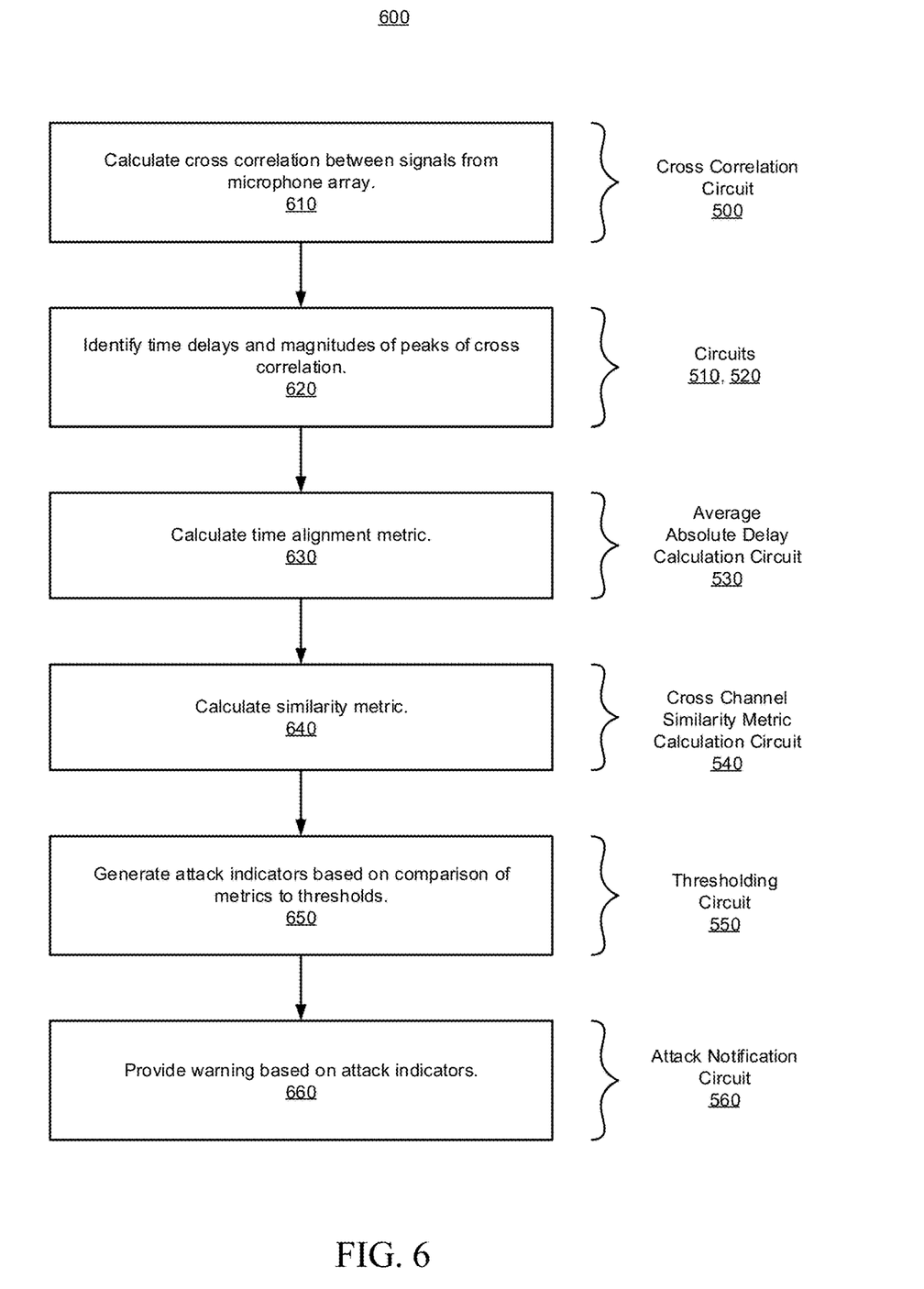
FIG. 6 is a flowchart illustrating a methodology for detection and prevention of laser-based audio attacks, in accordance with an embodiment of the present disclosure.

FIG. 6 is a flowchart illustrating a methodology 600 for detection and prevention of laser-based audio attacks, in accordance with an embodiment of the present disclosure. As can be seen, the example method includes a number of phases and sub-processes, the sequence of which may vary from one embodiment to another. However, when considered in the aggregate, these phases and sub-processes form a process for detection and prevention of laser-based audio attacks, in accordance with certain of the embodiments disclosed herein. These embodiments can be implemented, for example, using the system architecture illustrated in FIGS. 1-5, as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 600. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 6, in an embodiment, method 600 for detection and prevention of laser-based audio attacks commences by calculating, at operation 610, cross correlations between signals received from a plurality of microphones of an array of microphones.

Next, at operation 620, time delays associated with peaks of the cross correlations and magnitudes associated with the peaks of the cross correlations are identified.

At operation 630, a time alignment metric is calculated based on the time delays. In some embodiments, the time alignment metric is calculated as an average of absolute values of the time delays.

At operation 640, a similarity metric is calculated based on the magnitudes. In some embodiments, the similarity metric is calculated as a minimum of the magnitudes scaled by an average of autocorrelation magnitudes of the signals received from the plurality of microphones At operation 650, a first attack indicator is generated based on a comparison of the time alignment metric to a first threshold and a second attack indicator is generated based on a comparison of the similarity metric to a second threshold.

At operation 660, a warning of a laser-based audio attack is provided based on the first attack indicator and/or the second attack indicator.

Of course, in some embodiments, additional operations may be performed, as previously described in connection with the system. For example, a third attack indicator may be generated in response to determining that the signal is not received at all of the microphones of the array of microphones, and a warning may be provided based on the third attack indicator. In some embodiments, confirmation may be requested, prior to executing a command resulting from speech recognition of the received signals, in response to the generation of any of the attack indicators.

Example System

Figure 7:
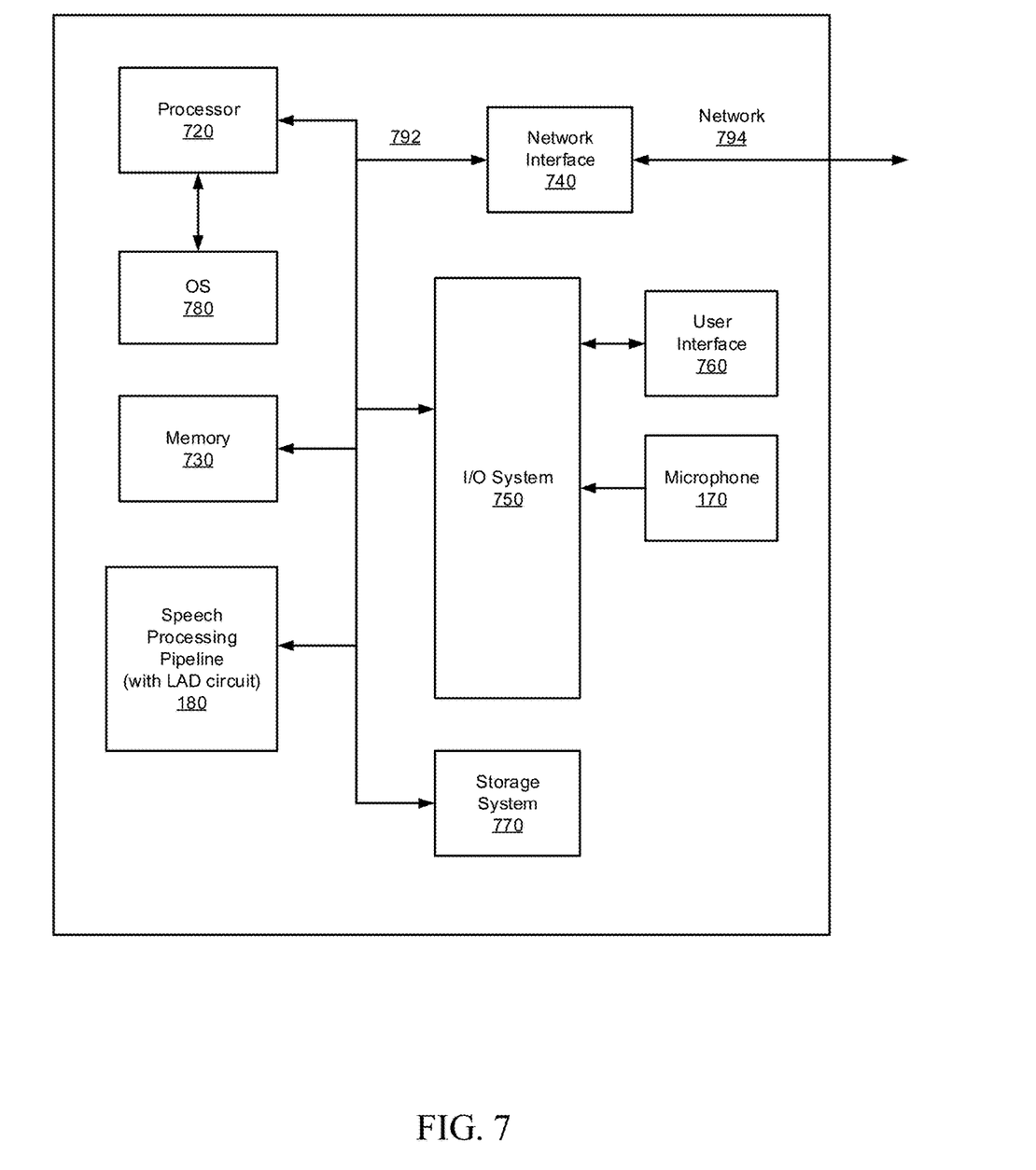
FIG. 7 is a block diagram schematically illustrating a computing platform configured to perform detection and prevention of laser-based audio attacks, in accordance with an embodiment of the present disclosure.

FIG. 7 is a block diagram schematically illustrating an example computing platform 700 configured to perform detection and prevention of laser-based audio attacks, in accordance with an embodiment of the present disclosure. In some embodiments, platform 700 may be a dedicated speech-enabled device or a speech-enabled device (e.g., 160) that is hosted on, or otherwise incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, home management system, and so forth. Any combination of different devices may be used in certain embodiments.

In some embodiments, platform 700 may comprise any combination of a processor 720, a memory 730, a speech processing pipeline 180 including laser attack detection circuit 330, a network interface 740, an input/output (I/O) system 750, a user interface 760, a microphone array 170, and a storage system 770. As can be further seen, a bus and/or interconnect 792 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with platform 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random-access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

Network interface circuit 740 can be any appropriate network chip or chipset which allows for wired and/or wireless connection between other components of platform 700 and/or network 794, thereby enabling platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760 and microphone array 170. User interface 760 may include devices (not shown) such as a display element, touchpad, keyboard, and mouse, etc. I/O system 750 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware or software.

Laser attack detection circuit 330 of the speech processing pipeline 180 is configured to detect and prevent a laser-based audio attack, as described previously. Laser attack detection circuit 330 may include any or all of the circuits/components illustrated in FIG. 5, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In some embodiments, these circuits may be installed local to platform 700, as shown in the example embodiment of FIG. 7. Alternatively, platform 700 can be implemented in a client-server arrangement wherein at least some functionality associated with these circuits is provided to platform 700 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for prevention of laser-based audio attacks, the method comprising: calculating, by a processor-based system, a time alignment metric based on time delays associated with peaks of cross correlations between signals received from a plurality of microphones of an array of microphones; calculating, by the processor-based system, a similarity metric based on magnitudes associated with the peaks of the cross correlations; generating, by the processor-based system, a first attack indicator based on the time alignment metric; generating, by the processor-based system, a second attack indicator based on the similarity metric; and providing, by the processor-based system, warning of a laser-based audio attack based on the first attack indicator and/or the second attack indicator.

Example 2 includes the subject matter of Example 1, wherein the time alignment metric is calculated as an average of absolute values of the time delays.

Example 3 includes the subject matter of Examples 1 or 2, wherein the similarity metric is calculated as a minimum of the magnitudes scaled by an average of autocorrelation magnitudes of the signals received from the plurality of microphones.

Example 4 includes the subject matter of any of Examples 1-3, further comprising generating a third attack indicator in response to determining that the signal is not received at all of the microphones of the array of microphones, and providing the warning based on the third attack indicator.

Example 5 includes the subject matter of any of Examples 1-4, further comprising requesting confirmation, prior to executing a command resulting from speech recognition of the received signals, in response to the generation of one or more of the first attack indicator, the second attack indicator, and the third attack indicator.

Example 6 includes the subject matter of any of Examples 1-5, wherein the array of microphones comprises at least four microphones distributed over a 3-dimensional volume.

Example 7 includes the subject matter of any of Examples 1-6, wherein the array of microphones comprises at least three microphones distributed over a 2-dimensional plane and the plane is oriented such that the plane is not perpendicular to an expected direction of arrival of an acoustic signal.

Example 8 includes the subject matter of any of Examples 1-7, wherein the array of microphones comprises at least two microphones and further comprising generating a third attack indicator in response to detecting differences in frequency response between signals received from the at least two microphones based on the similarity metric, and providing the warning based on the third attack indicator.

Example 9 is at least one non-transitory machine-readable storage medium having instructions encoded thereon that, when executed by one or more processors, cause a process to be carried out for prevention of laser-based audio attacks, the process comprising: calculating a time alignment metric based on time delays associated with peaks of cross correlations between signals received from a plurality of microphones of an array of microphones; calculating a similarity metric based on magnitudes associated with the peaks of the cross correlations; generating a first attack indicator based on the time alignment metric; generating a second attack indicator based on the similarity metric; and providing warning of a laser-based audio attack based on the first attack indicator and/or the second attack indicator.

Example 10 includes the subject matter of Example 9, wherein the time alignment metric is calculated as an average of absolute values of the time delays.

Example 11 includes the subject matter of Examples 9 or 10, wherein the similarity metric is calculated as a minimum of the magnitudes scaled by an average of autocorrelation magnitudes of the signals received from the plurality of microphones.

Example 12 includes the subject matter of any of Examples 9-11, further comprising generating a third attack indicator in response to determining that the signal is not received at all of the microphones of the array of microphones, and providing the warning based on the third attack indicator.

Example 13 includes the subject matter of any of Examples 9-12, further comprising requesting confirmation, prior to executing a command resulting from speech recognition of the received signals, in response to the generation of one or more of the first attack indicator, the second attack indicator, and the third attack indicator.

Example 14 is a system for prevention of laser-based audio attacks, the system comprising: a cross correlation circuit to calculate cross correlations between signals received from a plurality of microphones of an array of microphones; a peak finding circuit to identify time delays associated with peaks of the cross correlations and magnitudes associated with the peaks of the cross correlations; a time alignment circuit to calculate a time alignment metric based on the time delays; a similarity metric circuit to calculate a similarity metric based on the magnitudes; a thresholding circuit to generate a first attack indicator based on a comparison of the time alignment metric to a first threshold and to generate a second attack indicator based on a comparison of the similarity metric to a second threshold; and an attack notification circuit to provide warning of a laser-based audio attack based on the first attack indicator and/or the second attack indicator.

Example 15 includes the subject matter of Example 14, wherein the time alignment metric is calculated as an average of absolute values of the time delays.

Example 16 includes the subject matter of Examples 14 or 15, wherein the similarity metric is calculated as a minimum of the magnitudes scaled by an average of autocorrelation magnitudes of the signals received from the plurality of microphones.

Example 17 includes the subject matter of any of Examples 14-16, wherein the attack notification circuit is further to request confirmation, prior to execution of a command resulting from speech recognition of the received signals, in response to the generation of the first attack indicator and/or the second attack indicator.

Example 18 includes the subject matter of any of Examples 14-17, wherein the array of microphones comprises at least four microphones distributed over a 3-dimensional volume.

Example 19 includes the subject matter of any of Examples 14-18, wherein the array of microphones comprises at least three microphones distributed over a 2-dimensional plane and the plane is oriented such that the plane is not perpendicular to an expected direction of arrival of an acoustic signal.

Example 20 includes the subject matter of any of Examples 14-19, wherein the array of microphones comprises at least two microphones and the attack notification circuit is further to provide the warning based on a third attack indicator generated in response to detecting differences in frequency response between signals received from the at least two microphones based on the similarity metric.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A processor-implemented method for prevention of laser-based audio attacks, the method comprising:
    calculating, by a processor-based system, a time alignment metric based on time delays associated with peaks of cross correlations between signals received from a plurality of microphones of an array of microphones;
    calculating, by the processor-based system, a similarity metric based on magnitudes associated with the peaks of the cross correlations;
    generating, by the processor-based system, a first attack indicator based on the time alignment metric;
    generating, by the processor-based system, a second attack indicator based on the similarity metric; and
    providing, by the processor-based system, warning of a laser-based audio attack based on the first attack indicator and/or the second attack indicator.

2. The method of claim 1, wherein the time alignment metric is calculated as an average of absolute values of the time delays.

3. The method of claim 1, wherein the similarity metric is calculated as a minimum of the magnitudes scaled by an average of autocorrelation magnitudes of the signals received from the plurality of microphones.

4. The method of claim 1, further including generating a third attack indicator in response to determining that a signal is not received at all of the microphones of the array of microphones, and providing the warning based on the third attack indicator.

5. The method of claim 4, further including requesting confirmation, prior to executing a command resulting from speech recognition of the received signals, in response to the generation of one or more of the first attack indicator, the second attack indicator, and the third attack indicator.

6. The method of claim 1, wherein the array of microphones includes at least four microphones distributed over a 3-dimensional volume.

7. The method of claim 1, wherein the array of microphones includes at least three microphones distributed over a 2-dimensional plane and the plane is oriented such that the plane is not perpendicular to an expected direction of arrival of an acoustic signal.

8. The method of claim 1, wherein the array of microphones includes at least two microphones and further including generating a third attack indicator in response to detecting differences in frequency response between signals received from the at least two microphones based on the similarity metric, and providing the warning based on the third attack indicator.

9. At least one non-transitory machine-readable storage medium having instructions encoded thereon that, when executed by one or more processors, cause a process to be carried out for prevention of laser-based audio attacks, the process comprising:
    calculating a time alignment metric based on time delays associated with peaks of cross correlations between signals received from a plurality of microphones of an array of microphones;
    calculating a similarity metric based on magnitudes associated with the peaks of the cross correlations;
    generating a first attack indicator based on the time alignment metric;
    generating a second attack indicator based on the similarity metric; and
    providing warning of a laser-based audio attack based on the first attack indicator and/or the second attack indicator.

10. The computer readable storage medium of claim 9, wherein the time alignment metric is calculated as an average of absolute values of the time delays.

11. The computer readable storage medium of claim 9, wherein the similarity metric is calculated as a minimum of the magnitudes scaled by an average of autocorrelation magnitudes of the signals received from the plurality of microphones.

12. The computer readable storage medium of claim 9, further including generating a third attack indicator in response to determining that the signal is not received at all of the microphones of the array of microphones, and providing the warning based on the third attack indicator.

13. The computer readable storage medium of claim 12, further including requesting confirmation, prior to executing a command resulting from speech recognition of the received signals, in response to the generation of one or more of the first attack indicator, the second attack indicator, and the third attack indicator.

14. A system for prevention of laser-based audio attacks, the system comprising:
 a cross correlation circuit to calculate cross correlations between signals received from a plurality of microphones of an array of microphones;
 a peak finding circuit to identify time delays associated with peaks of the cross correlations and magnitudes associated with the peaks of the cross correlations;
 a time alignment circuit to calculate a time alignment metric based on the time delays;
 a similarity metric circuit to calculate a similarity metric based on the magnitudes;
 a thresholding circuit to generate a first attack indicator based on a comparison of the time alignment metric to a first threshold and to generate a second attack indicator based on a comparison of the similarity metric to a second threshold; and
 an attack notification circuit to provide warning of a laser-based audio attack based on the first attack indicator and/or the second attack indicator.

15. The system of claim 14, wherein the time alignment metric is calculated as an average of absolute values of the time delays.

16. The system of claim 14, wherein the similarity metric is calculated as a minimum of the magnitudes scaled by an average of autocorrelation magnitudes of the signals received from the plurality of microphones.

17. The system of claim 14, wherein the attack notification circuit is further to request confirmation, prior to execution of a command resulting from speech recognition of the received signals, in response to the generation of the first attack indicator and/or the second attack indicator.

18. The system of claim 14, wherein the array of microphones includes at least four microphones distributed over a 3-dimensional volume.

19. The system of claim 14, wherein the array of microphones includes at least three microphones distributed over a 2-dimensional plane and the plane is oriented such that the plane is not perpendicular to an expected direction of arrival of an acoustic signal.

20. The system of claim 14, wherein the array of microphones includes at least two microphones and the attack notification circuit is further to provide the warning based on a third attack indicator generated in response to detecting differences in frequency response between signals received from the at least two microphones based on the similarity metric.

* * * * *

UNITED STATES PATENT AND TRADEMARK OFFICE
CERTIFICATE OF CORRECTION

PATENT NO. : 11,961,535 B2
APPLICATION NO. : 16/941191
DATED : April 16, 2024
INVENTOR(S) : Trella et al.

Page 1 of 1

It is certified that error appears in the above-identified patent and that said Letters Patent is hereby corrected as shown below:

In the Drawings

Figure 1, Insert -- Laser Attack Scenario100 --
Figure 3, Insert -- Speech-Enabled Device Under Attack 160 --
Figure 4, Insert -- Time Delay as Function of Array Geometry 400 --
Figure 7, Insert -- Computing Platform 700 --

Signed and Sealed this
Second Day of July, 2024

Katherine Kelly Vidal
*Director of the United States Patent and Trademark Office*